March 17, 1953  H. C. ATKINS, JR  2,631,521

BEVERAGE MIXING CONTAINER

Filed Nov. 25, 1949

INVENTOR.
HENRY C. ATKINS, JR.
BY: Harold B. Hood
ATTORNEY.

Patented Mar. 17, 1953

2,631,521

UNITED STATES PATENT OFFICE 2,631,521

BEVERAGE MIXING CONTAINER

Henry C. Atkins, Jr., Indianapolis, Ind.

Application November 25, 1949, Serial No. 129,432

8 Claims. (Cl. 99—275)

The present invention relates to a beverage mixing container, and is primarily concerned with the provision of a device which may be secured, in fluid sealing relation, to the mouth of a beverage receptacle, the container being adapted to carry a charge of flavoring liquid, and being so constructed that, when properly manipulated, open communication will be established between the interiors of the receptacle and the container whereby the liquid in the container will be discharged into the receptacle, there to mix with the beverage contained therein.

Further objects of the invention, and structural details designed to accomplish such objects, will appear as the description proceeds.

To the accomplishment of the above and related objects, my invention may be embodied in the forms illustrated in the accompaying drawings, attention being called to the fact, however, that the drawings are illustrative only, and that change may be made in the specific constructions illustrated and described, so long as the scope of the appended claims is not violated.

Figure 1:
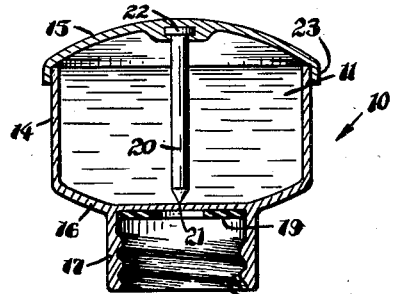
Fig. 1 is a vertical section through a container constituting one preferred embodiment of my invention.
Figure 2:
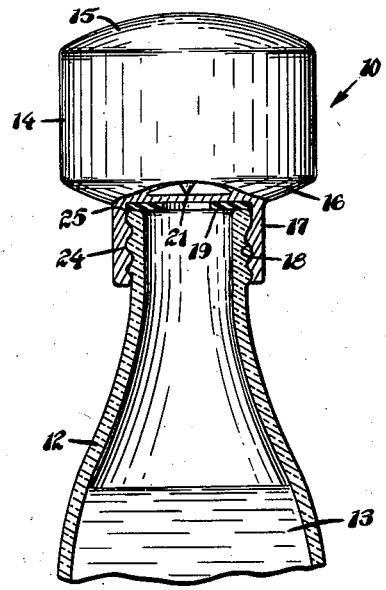
Fig. 2 is a side elevation thereof, parts being shown in section, in operative association with a suitable receptacle, fragmentarily shown.
Figure 3:
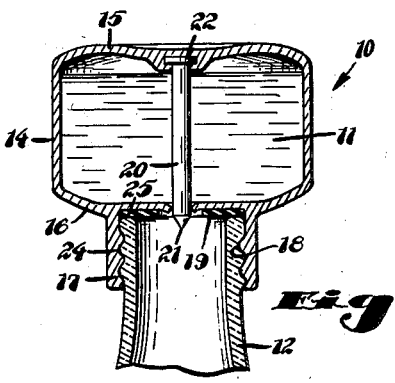
Fig. 3 is a fragmentary section of the assembly, the container having been manipulated to establish communication between the interiors of the container and receptacle.

Referring more particularly to the drawings, it will be seen that I have illustrated, in Figs. 1 to 3, a container indicated generally by the reference numeral 10, in which is stored a charge of liquid 11 of any suitable characteristics. In Figs. 2 and 3 I have indicated, fragmentarily, a beverage bottle 12 containing a suitable beverage 13. For instance, the bottle 12 may contain a carbonated beverage, while the charge 11 in the container 10 may be fruit juice, flavoring syrup, or any other liquid which it may be desired to mix with the carbonated beverage 13. If the bottle 12 contains a carbonated beverage, of course the pressure within the bottle will be superatmospheric. Preferably, the charge 11 will be uncarbonated, and the pressure within the container 10 will be substantially atmospheric.

While the container 10 may be made of almost any material, I prefer to form it of molded plastic, the walls being relatively thin and transparent or translucent. In the illustrated embodiment of the invention, the container comprises a cylindrical wall 14 closed at its top by a bulged, flexible wall 15 and at its bottom by a wall 16. Projecting axially from the wall 16 is a cylindrical flange 17 formed with an internal thread 18 which, in the illustrated embodiment of the invention, is a very coarse thread adapted for operative association with a thread conveniently moldable upon a glass bottle. In some instances, it may be desirable to make the flange 17 quite heavy so that it shall be substantially rigid. As shown, the flange 17 is integral with the bottom wall 16 of the container, but obviously it may be a separate element secured to the bottom wall 16 in any suitable fashion. In some instances, it may be desirable to make the container 10 and the flange 17 partially or entirely of metal; but the top wall 15 must be flexible, and preferably will be bulged as shown, if the perimetral wall 14 is rigid. Alternatively, the wall 14 might be formed as a bellows, whereby it will be axially collapsible, in which case the wall 15 may be rigid. As a still further variation, the walls 14 and 15 might be rigid, the wall 16 being flexible.

Preferably, a perforated sealing washer 19 will be nested within the flange 17 as shown for reasons which will become apparent as the description proceeds.

A needle 20 is suitably supported within the container 10 with its sharpened point 21 projecting toward, and into juxtaposition with, the bottom wall 16 of the container at a point within the boundaries of the flange 17. In the illustrated embodiment of the invention, the needle means 20 is provided with an enlarged head 22 embedded within the material of, or otherwise secured to, the top wall 15 of the container. It will be obvious that, when the wall 15 is flexed, or the container is otherwise manipulated to decrease the distance between the wall 15 and the wall 16, the needle 20 will puncture the bottom wall 16 at a point in registry with the perforation through the washer 19.

In the illustrated embodiment of the invention, the top wall 15 is formed as a separate element having a depending skirt 23 telescopically associated with the wall 14 which, after filling of the container, may be "plastic welded," or otherwise secured in place. This is, of course, only one means to provide for filling of the container; and it will be obvious that other means may be supplied for that purpose.

In the embodiment of the invention illustrated in Figs. 1, 2 and 3, the bottle 12 is formed, immediately at its mouth, with an integrally molded thread 24 adapted to be received in the internal thread 18 of the flange 17. In that embodiment of the invention, the container 10 acts as the sole seal for the bottle 12, the flange 17 being turned down on the bottle mouth thread to press the washer 19 into sealing engagement with the lip 25 of the bottle mouth. When the needle 20 is driven through the wall 16, by a sharp blow upon the bulged top wall 15, or by steady pressure thereagainst, as suggested in Fig. 3, the end of the needle will be subjected to the superatmospheric pressure within the bottle 12; and that pressure, together with the natural resiliency of the container walls, will cause the needle 20 to be retracted, thereby opening communication between the interiors of the container 10 and the bottle 12. Gas from the interior of the bottle will immediately bubble up through the liquid charge 11 in the container 10, whereby the pressure differential between the container and the bottle will be substantially equalized.

Now, the container 10 will be rotated to back the washer 19 gradually away from the bottle lip 25. Because of the character of the threads 18 and 24, excess gas within the bottle will escape between the flange 17 and the bottle mouth, until the pressure within the bottle is reduced substantially to atmospheric value. The gas which has bubbled up through the charge 11, as previously described, is trapped above that charge at its superatmospheric pressure, so that, as the pressure in the bottle 12 approaches atmospheric value, the pressure above the liquid 11 will discharge that liquid forcibly through the punctured wall 16 into the bottle, whereby the liquid 11 will be thoroughly mixed with the liquid 13. After the container 10 has been exhausted, the flange 17 will be removed from the bottle 12 and discarded, and the mixed beverage will be poured, or consumed directly, from the bottle.

While bottles have been shown in the drawings forming a part hereof, and the word "bottle" has been used throughout the above description, it will be clear, of course, that the invention is as applicable to beverages contained in cans or other types of receptacles, so long as the flange 17 is capable of association with the receptacle mouth; and of course the shape, size, and proportions of the flange 17 may be varied to render it associable with the mouth of almost any type of receptacle.

Figure 4:
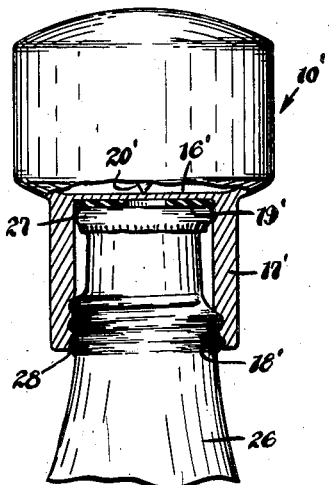
Fig. 4 is a view similar to Fig. 2, but showing a modified form of the invention.

In Fig. 4, I have shown a modified finish for a bottle 26. According to this embodiment of the invention, the bottle is provided with a conventional finish for the reception of a conventional sealing crown 27; and below that finish, the bottle is provided with an integrally molded, or otherwise produced, external thread 28. For association, with the bottle 26, the flange 17' is axially somewhat elongated, and is provided with an internal thread 18' only adjacent its free end. In this form of the invention, the washer 19' has a sealing engagement against the outer surface of the crown 27 so that, when the needle 20' is driven downwardly to puncture the wall 16' and the top of the crown 27, gas will not leak between the crown and the bottle wall 16', but will be confined and forced into the interior of the container 10'.

In other respects, the embodiment of the invention illustrated in Fig. 4 is identical with that illustrated in Figs. 1 to 3.

Figure 5:
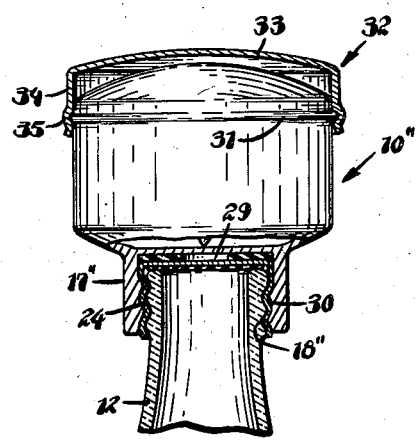
Fig. 5 is a similar view showing a still further modification.

In Fig. 5, I have shown a fragment of the bottle 12 provided with the thread 24 above described in connection with the embodiment illustrated in Figs. 1 to 3; and the container 10'' and the flange 17'' are substantially identical with the container 10 and flange 17, the flange 17'' being only slightly longer than the flange 17. I have shown, however, a crown 29, in place of the conventional crown 27, suitably secured to the bottle mouth, and provided with a skirt 30 enshrouding and conforming to, the thread 24. The thread 18'' is proportioned and designed for association with the external surface of the crown skirt 30.

In Fig. 5, I have shown the perimetral wall of the container 10'' provided, adjacent its upper end, with a bead 31; and I have shown a protective cap 32 associated with the container 10''. Said cap comprises a top wall or cover 33 and a perimetral skirt 34 formed, adjacent its free end, as at 35, for association with the bead 31. Preferably, the cap skirt 34 will have a snap fit on the bead 31; and its wall 33 will be sufficiently rigid to protect the top wall of the container from accidental flexure which might cause the needle to puncture the container bottom wall. The cover 32 may, of course, be associated, if desired, with any one of the various forms of container herein disclosed or discussed.

I claim as my invention:

1. A container of the character described having a bulging, flexible top wall and a bottom wall, means carried by the bottom wall for sealingly connecting said container to the open mouth of a bottle or the like, needle means carried by said top wall within said container and projecting into juxtaposition with a point in said bottom wall registering with said connecting means, said needle means being operative, upon flexure of said top wall, to puncture said bottom wall at such point, and a protective cap of relatively rigid material housing and shielding said top wall against accidental bottom wall-puncturing flexure.

2. The container of claim 1 in which said cap includes a perimetral skirt frictionally engaged with a perimetral surface of said container, and a rigid top carried by said skirt, spanning said container top wall, and spaced therefrom.

3. The combination with a receptacle having a mouth with a crown finish and a sealing crown closing the same, said receptacle further being provided with an external thread adjacent its mouth, of a container having a bottom wall and a flexible top wall, a cylindrical, internally-threaded flange axially projecting from said bottom wall and threadedly engaged with said receptacle thread whereby said container exerts pressure against said crown, and needle means movably mounted within said container and projecting toward a point on said bottom wall within the boundaries of said flange, said top wall being operatively connected to said needle means to shift the same, upon flexure of said top wall, to puncture said bottom wall and said crown to open communication between the interiors of said container and said receptacle.

4. The combination of claim 3 in which said receptacle thread is formed on the neck of said receptacle below said crown.

5. The combination of claim 3 in which said receptacle thread is formed within the region enshrouded by said crown, and the skirt of said crown conforms to said thread.

6. The combination with a receptacle having a mouth with a crown finish and a sealing crown closing the same, said crown being formed with an external thread, of a container having a bottom wall and a flexible top wall, a cylindrical, internally-threaded flange axially projecting from said bottom wall and threadedly engaged with said crown thread whereby said container exerts pressure against said crown, and needle means movably mounted within said container and projecting toward a point on said bottom wall within the boundaries of said flange, said top wall being operatively connected to said needle means to shift the same, upon flexure of said top wall, to puncture said bottom wall and said crown to open communication between the interiors of said container and said receptacle.

7. In combination, a receptacle containing a fluent material under superatmospheric pressure, a container containing a different fluent material under a pressure not substantially above atmospheric, said receptacle having a mouth and said container having a bottom wall, closure means for said receptacle mouth, cooperating threaded means for securing said container to said receptacle with a portion of said container bottom wall in contact with said receptacle mouth closure means, and a pointed implement supported within said container and movable relative to said container bottom wall to puncture said portion of said bottom wall and said closure means to establish open communication between the interiors of said receptacle and said container, whereby the pressures within said receptacle and said container will be equalized to discharge the fluent material from said container into said receptacle.

8. In combination, a receptacle containing a fluent material under superatmospheric pressure, a container containing a different fluent material under a pressure not substantially above atmospheric, said receptacle having a mouth and said container having a bottom wall, a closure cap for said receptacle mouth, said cap being formed to provide a threaded, cylindrical wall, a cylindrical projection on said container threadedly engaged with said cap wall to secure said container to said receptacle with a portion of said bottom wall in registry with said receptacle mouth, and a pointed implement supported within said container and movable relative to said container bottom wall to puncture said portion of said bottom wall and said cap to establish open communication between the interiors of said receptacle and said container, whereby the pressures within said receptacle and said container will be equalized to discharge the fluent material from said container into said receptacle.

HENRY C. ATKINS, Jr.

REFERENCES CITED

The following references are of record in the file of this patent:

UNITED STATES PATENTS

| Number | Name | Date |
|---|---|---|
| 1,677,253 | Scofield | July 17, 1928 |
| 1,948,306 | Meurer | Feb. 20, 1934 |
| 2,073,273 | Westein | Mar. 9, 1937 |
| 2,091,737 | Longway | Aug. 31, 1937 |
| 2,220,146 | Curry | Nov. 5, 1940 |
| 2,387,978 | Casey | Oct. 30, 1945 |

FOREIGN PATENTS

| Number | Country | Date |
|---|---|---|
| 245,374 | Germany | Feb. 5, 1910 |